(12) United States Patent
Brundage et al.

(10) Patent No.: US 6,365,259 B1
(45) Date of Patent: Apr. 2, 2002

(54) HIGH STRENGTH/HIGH SURFACE AREA ALUMINA CERAMICS

(75) Inventors: Kevin R. Brundage, Corning; Srinivas H. Swaroop, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/467,741

(22) Filed: Dec. 20, 1999

Related U.S. Application Data
(60) Provisional application No. 60/113,898, filed on Dec. 28, 1998.

(51) Int. Cl.[7] .................................................. B32B 3/12
(52) U.S. Cl. ..................... 428/116; 423/626; 423/628; 264/176.1; 264/209.1; 264/211; 264/211.2
(58) Field of Search ...................... 428/116; 423/626, 423/628; 264/176.1, 209.1, 211, 211.12

(56) References Cited

U.S. PATENT DOCUMENTS

| | | |
|---|---|---|
| 3,917,808 A | 11/1975 | Leach et al. |
| 3,969,273 A | 7/1976 | Brown et al. |
| 4,081,406 A | 3/1978 | Sawyer |
| 4,124,536 A | 11/1978 | Itoh et al. |
| 4,132,669 A | 1/1979 | Choca et al. |
| 4,379,134 A * | 4/1983 | Weber et al. |
| 4,631,267 A | 12/1986 | Lachman et al. |
| 4,631,268 A | 12/1986 | Lachman et al. |
| 4,637,995 A | 1/1987 | DeAngelis et al. |
| 4,965,243 A | 10/1990 | Yamada et al. |
| 5,039,644 A | 8/1991 | Lachman et al. |
| 5,124,302 A | 6/1992 | Lachman et al. |
| 5,538,681 A | 7/1996 | Wu |
| 5,660,778 A | 8/1997 | Ketcham et al. |

* cited by examiner

Primary Examiner—Deborah Jones
Assistant Examiner—Wendy Boss
(74) Attorney, Agent, or Firm—Kees van der Sterre

(57) ABSTRACT

Ceramic honeycombs incorporating cell walls of a sintered alumina material providing controlled pore size distribution in combination with high BET surface area and flexural (MOR) strength are formed by the extrusion, drying and firing of plasticized alumina powder batches containing major proportions of anhydrous, high-surface-area gamma alumina powders dispersed with selected acids; low combined drying and firing shrinkages provide strong, crack-free bodies of high surface area and strength.

8 Claims, No Drawings

HIGH STRENGTH/HIGH SURFACE AREA ALUMINA CERAMICS

This application claims the benefit of U.S. Provisional Application No. 60/113,898, filed Dec. 28, 1998, entitled "High Strength/High Surface Area Alumina Ceramics", by Brundage et al.

BACKGROUND OF THE INVENTION

The present invention addresses the need, for many applications, for an alumina honeycomb monolithic support that combines both high strength and a high B.E.T. surface area (over 100 m$^2$/g). In the past, it has been found difficult to obtain both high strength and high surface area in extruded alumina honeycomb structures without the incorporation of binder materials that reduce the purity and/or chemical activity of the alumina for catalytic applications.

The petrochemical industries currently use a variety of pellet type structures formed of gamma alumina or other oxides, e.g., pellets, pills, beads, rings, trilobes, stars, and so forth, as catalysts or catalyst support media for catalytic reactions. These structures are typically formed by extrusion from batch mixtures of alumina or other selected oxides, followed by drying and calcining. The objective is to produce shapes which are crush- and attrition-resistant when packed into reactor beds; due to their thick cross-sections and compact geometric shapes, the tensile strengths of such extruded shapes is generally not of concern. U.S. Pat. Nos. 3,969,273, 3,917,808 and 4,132,669 provide examples of aqueous extrusion batches incorporating combinations of various acids for the preparation of extruded pellets or pills of hydrated alumina, calcined (e.g. gamma) alumina, and combinations of alumina with phosphorous or other oxides.

Although technologies for making durable, active pellet-type alumina supports or catalysts are well developed, such structures are not optimally configured for most catalytic reactor applications. Pellet beds tend to exhibit relatively high flow resistance in comparison with honeycomb supports, and also develop preferential flow paths which exhaust portions of the catalyst while leaving other portions relatively unused.

Ceramic honeycombs are used in many applications in which the ceramic substrate serves simply as a physical structural support for a chemically active, high-surface-area catalyst support coating. A typical coating for these applications is a high surface area washcoating of gamma-alumina deposited on the channel walls of the ceramic honeycomb. U.S. Pat. No. 4,965,243 describes coated honeycomb structures of this type useful for automotive catalytic converters.

However, for many applications porous washcoatings are inadequate and catalysts or catalyst supports made up mostly or entirely of active, high-surface-area material must instead be used. Such applications include chemical processes wherein the kinetics of the chemical reaction(s) on the catalyst are slow relative to the diffusion and mass transfer steps involved in the overall process. An example is the hydro-desulfurization of fossil fuels in the petrochemical industry to make low sulfur gasoline and diesel fuels. Since the reaction kinetics are the slow step in such processes, it is important to provide a relatively large accessible BET catalyst support surface (more catalyst sites in a given volume) in order to allow the most effective use of reactor volume. This in turn requires that the entire volume of the catalyst or catalyst support structure be made of active, high-surface-area material, and that the pore structure of the material be such that that the reactants can diffuse in and products diffuse out of the volume of the catalyst support effectively over relatively long distances. The potential advantages of honeycomb structures of appropriate porosity and surface area in such applications include better selectivity, higher yield, lower pressure drop, lower waste or emissions, and more compact reactor designs.

Even for applications such as automotive catalytic converters, where reaction kinetics are usually not rate limiting, thinner-walled, lower mass catalyst supports are being developed to decrease exhaust gas back-pressure and improve reactor efficiency. However, with decreasing wall thickness the thermal mass contribution of the ceramic substrate relative to the gamma alumina catalyst support coating becomes an increasingly important factor that restricts the light-off speed of the reactor. A honeycomb that incorporates only active support material while dispensing with inert supporting structure will offer substantial performance advantages, and eliminate the separate and costly alumina washcoating step as well.

In order to take advantage of the potential benefits of alumina honeycombs, however, both the strength and surface area of the honeycombs must be maintained or improved. Many potential honeycomb applications require a high B.E.T. surface area for effective catalyst function, i.e., at least about 50 m$^2$/gram, and from 150–200 m$^2$/gram or more for some applications. High strength and good resistance to flaking are needed to maintain the structural integrity of the support in a hostile reactor environment. Higher B.E.T. surface areas mean a more compact reactor, which could lead to significant cost reductions for the overall reactor system.

In contrast to the formulations employed to provide pelletized alumina or other active oxide supports, the extrusion of honeycomb structures from simple oxides or mixtures has involved the use of supplemental bonding agents. These are typically incorporated in the extrusion batch with the oxides and remain in the fired honeycombs as permanent binders, to achieve useful flexural strength levels in the fired structures. Relatively high tensile strength, as measured by flexural modulus of rupture tests of the fired oxides or mixtures, is required to impart useful strength and durability to the fired thin-walled structures. However, such strength must be attained at low to moderate firing temperatures in order preserve the high porosity and B.E.T. surface area of the oxide starting materials.

U.S. Pat. No. 4,631,267 teaches the manufacture of extruded honeycombs of alumina, silica and titania composition that incorporate precursors for permanent silica, alumina and titania binders in powdered alumina, titania or silica extrusion batches. The precursors for the permanent binders are generally liquid solutions or dispersions of oxide-yielding compounds such as titanium isopropoxide or silicone solutions or hydrated alumina slurries, these being converted to small crystallite bonding deposits of the respective oxides on firing. Alumina honeycombs produced by this method can exhibit B.E.T. surface areas in excess of 70 m$^2$/g and MOR (flexural modulus of rupture) strengths above 2000 psi after firing at temperatures in the 500–1000° C. range.

Although the method of this patent provides alumina products of high surface area, it has not yet found extensive commercial application. Shortcomings of the disclosed method include the relatively high cost of the permanent binder materials, and the limited effectiveness of such binders in terms of the range of powders which can be successfully treated and the levels of fired product strength which may be obtained. Good results have been demonstrated for hydrated alumina batch powders, but the resulting batches are subject to high drying and firing shrinkages which create significant production and yield problems for fine cellular structures such as honeycombs.

What is therefore required is a method for producing alumina honeycombs that produces products of high strength and surface area, yet is still economic in terms of raw materials costs and processing yields.

SUMMARY OF THE INVENTION

The present invention is founded upon the discovery that the incorporation of relatively small amounts of inorganic or simple organic acids directly into powdered alumina extrusion batches can provide honeycombs exhibiting an excellent combination of high strength and high surface area. Moreover, the method can be used with powdered alumina batches that include substantial proportions of anhydrous high-surface-area (gamma) alumina powders, these offering a significant processing advantage in terms of reduced drying shrinkage, and therefore process yield. Strength increases of from 45–200% or more over the strengths typically attained in conventional honeycomb batches fired at the same temperature can be developed by this means.

For best retention of high surface area, the peak temperatures used to fire the extruded honeycombs should be maintained below about 1000° C. Yet even at firing temperatures in the 500–750° C. range, sintered alumina materials forming honeycomb structures in accordance with the invention have much higher strength, as determined by flexural modulus of rupture (MOR) testing, than similarly fired alumina formed without batch additions of selected acids.

Therefore, in a first aspect, the invention includes an improved method for making a strong extruded high-surface-area alumina-containing body such as an alumina honeycomb. In accordance with that method, a powder component for an extrusion batch is first provided, that powder consisting predominantly (at least about 80% by weight) of alumina powders and including at least one anhydrous high-surface-area alumina powder. By anhydrous alumina powder is simply meant an alumina powder that does not incorporate significant water of hydration. The anhydrous alumina portion of the powder batch should constitute a substantial proportion, i.e. at least about 40% by weight, of the dry powder batch.

The powder component of the batch is next combined with water, an acid, and a plasticizing temporary binder to form an extrusion batch. The proportions of water and plasticizing binder should be sufficient to form an extrudable plasticized batch. The acid is included in an amount at least effective to increase the ultimate fired bending strength of the final alumina body, this typically requiring at least about 1% by weight of the selected acid in the combined batch.

The combined batch is next thoroughly mixed for a time at least sufficient to achieve plasticization and good batch homogeneity, and is then extruded to form green alumina preforms of a desired shape. Complex shapes such as extruded honeycombs may readily be formed from well-plasticized mixtures, although pellets or other shapes could be formed as well.

Following extrusion, the green alumina preforms must be well dried prior to firing. Drying may comprise heating or otherwise treating the preform to accelerate water removal, although overly rapid drying must be avoided to prevent cracking of the preforms as the result of uneven shrinkage. Advantageously, the problems attending drying shrinkage in preforms produced in accordance with the invention are substantially less than encountered using hydrated gamma alumina precursors, due to the substantial proportion of non-hydrated alumina powders included in the batch.

The dried green alumina preforms are finally consolidated by firing at temperatures sufficient to bind the alumina powders into strong but porous alumina products. Since excessive firing temperatures reduce preform porosity and surface area, while insufficient heating results in a weak product, firing temperatures in the range of about 500–1000° C. are employed. Depending upon batch composition and processing parameters, such firing can produce porous, high-surface-area products with large pore volumes and surfaces areas in excess of 100 $m^2/g$, preferably in excess of 150 $m^2/g$ as determined by conventional BET methods. At the same time, flexural strengths of 1500–3000 psi or greater in the honeycomb wall material, as determined by conventional flexural modulus-of-rupture (MOR) bar sample testing, are provided.

Strength and surface area results obtained in accordance with the invention depend importantly on the nature of the acid selected. Large strength enhancements are observed with weak organic acids such as acetic acid; results obtained through the substitution of other acids are variable. Also important is the method of introducing the acid component into the extrusion batch. Surprisingly, adding the acid during or subsequent to the dispersion of the anhydrous alumina component in water can provide significantly higher strength in fired alumina honeycombs than normally results from the direct addition of a weak (or strong) acid component to a dry alumina mix.

DETAILED DESCRIPTION

The invention is particularly adaptable to the production of strong, high-surface-area alumina honeycomb catalysts or catalyst supports, since it enables the direct honeycomb extrusion of alumina batches combining major proportions of gamma alumina. The preferred batches will consist essentially entirely of alumina powders, and will include 40–100% by dry weight of non-hydrated gamma alumina in combination with the selected acid, water, and a suitable temporary plasticizing binder. Optional batch additions may include one or more surfactants, lubricants or other mixing or extrusion aids, although these are not required to obtain strong, high-surface-area products.

Commercially available gamma alumina powders constitute suitable sources of the anhydrous high-surface-area alumina batch component, with powders of surface areas above 200 $m^2/g$ being readily available. Where other porous alumina materials are to be included in the batch, commercial alumina preparations that, upon calcining, provide gamma-alumina or other transition aluminas of high surface area can be used. Examples of the latter include commercially available boehmite and pseudo-boehmite powders. The particle sizes of the alumina materials employed in formulating the batches are not critical, but may be adjusted as desired for the purpose of modifying the internal pore size and size distribution of the product.

The inclusion of a temporary binder in the honeycomb formulations of the invention is helpful to improve the plasticity of the compounded batch for better extrusion characteristics. By a temporary binder is meant a binder that is substantially completely burned off at the temperature at which the honeycomb is fired. The temporary binder can be any of the well-known materials routinely used in the ceramic arts for such purposes. Common examples include the cellulose ether binders such as methyl cellulose, commercially available as Methocel cellulose ether products from the Dow Chemical Co.

The weight proportions of alumina, water and temporary binder and acid may be adjusted as necessary to obtain a consistency and plasticity desirable for extrusion, together with a "green" strength adequate for handling the honeycombs after forming but before firing. Generally, 1–10 parts by weight of the selected temporary binder are added for each 100 parts by weight (dry) of alumina powders. Surfactants, if present, will normally not exceed about 2 parts by weight per 100 parts of alumina powder, at least where a conventional extrusion aid such as sodium stearate or stearic acid is used. Water is included in proportions necessary to provide a plastic extrusion batch, typically in amounts between about 40–90% by weight of the total batch weight of dry and wet ingredients.

As noted above, the acid selected for incorporation into the combined batch can have a significant effect on the properties of the final alumina product. The use of acetic acid is particularly preferred, although other short-chain organic acids such as formic acid can offer a somewhat smaller strength enhancement benefit. Satisfactory results are also expected from monovalent mineral acids such as HNO3 and perhaps HCL, if used in concentrations (in milliequivalents of acid per 100 g alumina) similar to those used in acetic acid-containing batches. The latter batches typically comprise at least 1% by weight of acid in the combined (wet) batch, more preferably about 1–5 parts concentrated (99–100%) acetic acid for each 100 parts of anhydrous alumina by weight. On the other hand, the strength improvements observed with higher molecular weight organic acids such as citric acid and oleic acid appear to be much less significant.

Prior to introducing the liquid and acid components into the batch, it is desirable that the dry batch components be first thoroughly mixed, for example, in dry blending equipment such as a Littleford™ mixer. Thereafter, the blended dry batch can be transferred to batch blending and plasticizing apparatus such as a mix-muller for combination with the water and acid ingredients of the batch. In general, best combined batch quality is obtained by first adding the acid to the batch water, and then adding a well mixed dry blend of the alumina, temporary binder and optional extrusion aids to the mix, with continued blending until a homogeneous plasticized mass is obtained. If desired, the plasticized batch produced by the muller or other mixer may then be pre-extruded through a spaghetti die one or several times, to complete the mixing process and remove any air inclusions from the mixture prior to final forming.

Forming of the plasticized batch into alumina honeycombs or other products can be carried out utilizing ordinary extrusion equipment together with any of the known ceramic honeycomb dies employed for honeycomb extrusion in the prior art. The handling characteristics of the alumina batches provided according to the invention are such that a relatively wide range of honeycomb geometries can readily be produced. Honeycombs having cell wall thicknesses in the range of 0.1–2 mm and cell densities in the range of 10–600 cells/in2 of honeycomb cross-section can be formed with commercially available ceramic ram or screw extruders and ceramic honeycomb extrusion dies of appropriately selected dimensions and cell shapes.

Extruded alumina honeycomb shapes produced as above described may be dried in accordance with practices conventional for the production of ceramic honeycombs. Advantageously, however, the rate of drying can be somewhat more rapid than in the case of conventional alumina honeycombs since the risks of cracking and shape distortion are correspondingly reduced. This is because the drying shrinkages observed with these batch mixtures can be 50% or more below those typically observed in honeycombs produced principally from hydrated alumina materials (alumina monohydrates and trihydrates such as commercial boehmite materials). Depending on the amount of hydrated material included in the batch, the latter can exhibit linear drying shrinkages as high as 18–25%.

Firing of the dried honeycombs is carried out at relatively low temperatures, generally in the range of 500–1000° C. With the alumina batches provided as above described, strong bonding of a honeycomb support structure or catalyst without undue surface pore consolidation and/or loss of internal wall porosity can readily be achieved at these temperatures. Most advantageously, strong products are produced without resort to permanent binders, or the use of other bonding strategies relying on supplemental bonding additives such as used in the prior art to provide high strength, high-surface-area structures.

The firing shrinkages demonstrated by the dried green products vary depending upon the presence or absence of hydrated alumina from the batch, as well on the peak firing temperature employed. In general, however, linear firing shrinkages are relatively small (on the order of 3%) and do not unacceptably degrade final product surface area and wall porosity.

The invention is further described in the following examples, which are intended to be illustrative rather than limiting.

Example 1

Alumina Honeycomb Extrusion

A batch for an extruded alumina honeycomb is compounded by first preparing an alumina powder dry batch blend. The alumina powders selected for incorporation in the batch include 75 parts by weight of LaRoche GL-25 gamma alumina powder and 25 parts by weight of LaRoche V-700 pseudo-boehmite (alumina hydrate) powder, each of these powders being obtained commercially from LaRoche Industries, Inc. of Baton Rouge, La. The selected alumina powders are charged into a Littleford™ mixer along with 6 parts by weight of F40M methyl cellulose binder, commercially obtained from the Dow Chemical Company, Midland, Mich.

After these dry ingredients have been thoroughly mixed, they are transferred to a mix-muller and then water, in a proportion of about 85 parts by weight of water for each 100 parts of alumina by weight, is added. Before adding, glacial acetic acid is mixed with the water in a proportion of about 2 parts of acid for each 100 parts by weight of alumina powder. Mixing of the combined water-powder batch is continued for about 15 minutes to achieve homogeneity and plasticization of the batch.

The batch thus prepared is loaded into a ram extruder and formed into green honeycomb and rod preforms. The honeycombs thus provided are about 3 inches in diameter and include about 25 channels of 0.037 inches channel wall thickness per square inch of honeycomb cross-section.

The resulting wet preforms are dried in air in a temperature-controlled oven by heating from 30° C. to 60° C. over a heating interval of 174 about hours while reducing the relative humidity in the oven from about 95% to 50%. Next, the dried honeycombs are fired in an electric kiln to a peak temperature of 750° C. The fired honeycombs and rods are then examined to measure shrinkage and determine surface area and surface porosity.

Modulus of rupture testing of the rod samples in four-point bending indicates a material strength for the fired alumina of about 1700 psi, an increase of about 140% over the MOR strength of a similarly processed gamma alumina-based mixture prepared without the acetic acid, wherein a permanent binder in the form of an alpha alumina sol was employed instead. In addition to high strength, the fired material retains a surface area of about 188 $m^2/g$ as determined by the nitrogen BET method.

Pore volume measurements taken by nitrogen adsorption on the fired products indicate an open pore volume of about 0.58 ml/g. The pore size distribution as determined by mercury intrusion porosimetry is reported in Table 1 below:

TABLE 1

Fired Alumina Pore Size Distribution

| Pore Size Range (um) | % of Pore Volume in Size Range |
|---|---|
| <70 | 9.2 |
| 70–100 | 52.3 |
| 100–150 | 32.7 |
| 150–200 | 1.7 |
| 200–300 | 1.6 |
| 300–1000 | 1.3 |
| >1000 | 1.3 |

As these data suggest, the strong porous walls of the fired alumina honeycomb exhibit a single mode of porosity, with the available pore volume being concentrated predominantly in the 70–150 μm pore size range.

Table 2 below sets forth additional examples of alumina honeycomb structures made following the procedure of Example 1 above. Examples 2–4 were formed from gamma-alumina-containing batches made up in accordance with the invention, while the Comparative Example is a honeycomb produced entirely from a hydrated alumina (boehmite) source material. Included in Table 2 for each of the examples reported are the makeup of the powder batch, the cell density of the extruded honeycomb, in cells per square centimeter, the surface area of the sintered alumina forming the honeycomb walls, in square meters per gram, the pore volume of the wall material, in milliliters per gram, the pore size distribution within the pore volume, as a fraction of the total pore volume, and modulus-of-rupture strengths of the sintered honeycomb-forming material for those honeycombs where strength values were determined. All of the honeycomb batches included a methyl cellulose binder/plasticizer and an acid additive for the batch water, these being included in proportions of about 1 part per hundred and 4 parts per hundred of the weight of alumina powder in the batch. All of the dried green honeycombs were fired to a temperature of about 750° C. before testing.

As the data in Table 2 reflect, all samples exhibit reasonably large surface area, and in addition, have a pore volume distribution such that the greater proportion of pore volume (>60%) is concentrated in pores of a diameter below about 200 Å. However, the comparative example exhibited very large drying and firing shrinkage in the course of fabrication, linear shrinkage for the combined processes being in excess of 22%. In addition, the comparative example had a pore volume as determined by nitrogen adsorption testing of only about 0.4 ml/gram.

TABLE 2

Alumina Honeycombs

|  | Example 2 | Example 3 | Example 4 | Comparative Example A |
|---|---|---|---|---|
| Composition - Alumina Powder Component | 75% γ-Alumina A 25% Boehmite A | 75% γ-Alumina A 25% Boehmite B | 75% γ-Alumina A 25% Boehmite B | 100% Boehmite B |
| Honeycomb Design (cells/cm2) | 100 cells/cm2 | 50 cells/cm2 | 50 cells/cm2 | 100 cells/cm2 |
| Surface Area ($m^2/g$) | 190 | 161 | 170 | 182 |
| Internal Pore Volume (ml/g) | .6665 | .7676 | .5435 | .4000 |
| Pore Volume Distribution (% in range) | | | | |
| <70 | 7.9 | 6.8 | 9.1 | 30.6 |
| 70–100 | 33.6 | 24.2 | 30.2 | 56.0 |
| 100–150 | 30.5 | 30.8 | 41.8 | 7.9 |
| 150–200 | 4.1 | 7.2 | 15.0 | .6 |
| 200–300 | 1.5 | 2.5 | 1.4 | .6 |
| 300–1000 | 3.4 | 3.9 | 1.0 | .6 |
| >1000 | 19.1 | 24.6 | 1.4 | 3 |
| Average MOR Strength (psi) | 2280 | — | — | 2583 |

Boehmite A = Criterion Boehmite
Boehmite B = LaRoche V-700 pseudo-boehmite
γ-Alumina A = LaRoche Versal GH-22 gamma alumina As previously noted, pore volume is a characteristic of particular significance for many catalytic applications since high porosity has at least the potential for reducing the amount of catalyst needed, and thus the size and cost of the reactors required. A particular advantage of honeycombs provided in accordance with the invention is that they can offer high pore volume in addition to high strength. For example, honeycombs with minimum aggregate pore volumes of at least about 0.5 ml/gram can readily be provided from the compositions herein described.

Also important for many chemical processing applications is the pore size distribution existing within the available pore volume. Through careful selection of batch materials and control over batch processing and firing variables, it is possible to exercise a good measure of control over pore size distribution in these products. This may include the manufacture of honeycombs having most or substantially all of the available pore volume residing within a relatively narrow range of pore diameters. For example, honeycombs for one specific application wherein at least 80% (preferably at least 90%) of the accessible pore volume resides in pores having diameters in the range of about 30–300 Å. can be repeatably made.

The effectiveness of acid additions on the properties of honeycombs made from batches containing a substantial gamma alumina content is further illustrated in Table 3 below. Table 3 reports the composition and properties of two honeycombs made in accordance with the invention and four honeycombs made from batches of alternative composition, the compositions being reported in parts by weight exclusive of water content.

Included in Table 3 for each of the products reported are a listing of batch components, in parts by weight, including an identification of the alumina powders present in the batch as well as the proportions of temporary binder/plasticizer and any acetic acid water additive to the batch. Also reported are identifications for each of the alternative binding additives incorporated into the comparative batches, these including a colloidal alumina permanent binder and an alternative acid addition to the batch. All products in Table 3 were fired at a peak temperature of 750° C.

The surface areas, pore volumes and product MOR strengths reported were determined as in Table 2 above; the shrinkage values reported are total linear shrinkages, i.e., the combined the drying and the firing shrinkages, for each of the fired products, given as a percent of the initial length of the wet extruded honeycombs.

The advantageous effects of wet batch acid additions on the properties of the resulting fired honeycombs are best illustrated by comparing Examples 5 and 6 to Comparative Examples 5' and 6'. The comparative examples were formed using a colloidal alumina permanent binder in place of the acetic acid additive in the extrusion batch, this binder being added to the dry batch in partial replacement of the acid-water addition. In general, honeycombs such as Examples 5 and 6, produced using wet batch acid additions in accordance with the invention, exhibit much higher fired strengths than similar gamma alumina batches formed with permanent alumina binders. Yet the fired products made according to the invention still retain high surface area and pore volume.

In Comparative Example B, hydrated alumina powder only was used, and a dry batch addition of high molecular weight organic acid replaced the acetic acid wet batch addition. The fired product had high surface area and pore volume, but unacceptable fired strength. Using the same hydrated powder with an acetic acid wet batch addition in Comparative Example C resulted in good strength recovery in the fired product, but the shrinkage of the wet extruded honeycomb in the course of drying and firing was unacceptably high.

In addition to the effects of binder selection on product properties, other batch composition and processing variables can affect results such as product strength and wall surface area. With respect to alumina powder particle size, the general trend is toward higher strengths, but with somewhat higher shrinkage, as the particle sizes of the alumina powders are reduced.

In one series of extrusions the particle size of the gamma alumina powder used in Example 5 above was reduced from –140 mesh (U.S. Standard Sieve), as used in Example 5, to successive maximum powder particle sizes of 150 mesh, 230 mesh, and 325 mesh. The boehmite particle sizes were similarly reduced.

The effect of these reductions in gamma alumina particle size was to increase product strength from an average of about 2200 psi at 140 mesh to over 3700 psi at the lowest (325 mesh) end of the gamma alumina particle size range. Gamma alumina particle size, rather than boehmite particle size, was found to be the more important variable affecting

TABLE 3

Alternative Binders and Acid Effects

| Batch Components | Example 5 | Comparative Example 5' | Example 6 | Comparative Example 6' | Comparative Example B | Comparative Example C |
|---|---|---|---|---|---|---|
| γ-Alumina A | 75.0 | 75.0 | — | — | — | — |
| γ-Alumina B | — | — | 100.0 | 100.0 | — | — |
| Boehmite B | 25.0 | 25.0 | — | — | — | — |
| Boehmite C | — | — | — | — | 100.0 | 100.0 |
| Acetic Acid | 4.0 | — | 4.0 | — | — | 4.0 |
| Temporary Binder | 6.0 | 6.0 | 6.0 | 6.0 | 6.0 | 6.0 |
| Permanent Binder | — | 100.0 | — | 100.0 | — | — |
| Stearic Acid | — | — | — | — | 1.0 | — |
| Properties: | | | | | | |
| Total Shrinkage (%) | 11.7 | 8.1 | 18.5 | 20.7 | 14.9 | 22.7 |
| Average MOR Strength (psi) | 2190 | 580 | 1725 | 809 | 856 | 2494 |
| Pore Volume (ml/g) | 0.59 | 0.66 | — | 0.59 | 0.93 | 0.84 |
| Surface Area (m²/g) | 183 | 158 | 205 | 132 | 205 | 235 |

Boehmite C = LaRoche V-250 pseudo-boehmite
Acetic acid = glacial (99+%) acetic acid
Temporary Binder = Dow Methocel F-240 methylcellulose
Permanent Binder = Nyacol A colloidal alpha alumina slurry product strength. In all of the above cases, total product drying and firing shrinkage remained below 15%, while honeycomb surface areas remained above 160 m²/g and pore volumes remained above about 0.5 ml/g.

The available data from these particular extrusions suggest that, for best strength in honeycombs of high pore volume and small to medium average pore size, gamma aluminas having an average particle size not exceeding about 35 micrometers and a maximum particle size not exceeding about 140 mesh (45 micrometers), more preferably not exceeding about 230 mesh, will be preferred. Within these particle size ranges, honeycombs having both substantial pore volumes and material strengths in excess of 2,000 psi, some in excess of 2500 psi can readily be provided.

Still further improvements in honeycomb wall strength can be achieved through the use of a supplemental high-shear mixing step, carried out after initial batch mixing but prior to final extrusion of the wet green honeycomb shape. For reasons not fully understood, a intermediate shearing step in the batch preparation process has a beneficial effect on product strength, yet is not deleterious to the surface area and porosity of the fired products.

The preferred method for carrying out the batch shearing step is to pre-extrude the mixed batch through a small orifice or orifice array, such as a spaghetti die. Significant enhancements in honeycomb wall strength, in some cases to MOR levels in excess of 4000 psi, can be achieved using dies with orifice sizes not exceeding about 3 mm. Multiple pre-extrusions of the plasticized batch may be resorted to if desired, but the ultimate result in terms of strength will naturally depend on batch composition variables as well as the batch processing procedures employed.

While the foregoing illustrations and descriptions provide specific examples of compositions, processes and apparatus useful in the practice of the invention, it will appreciated by those skilled in the art that many variations upon the concepts and embodiments particularly disclosed herein may be resorted to for the economic manufacture of extruded alumina honeycombs and other products within the scope of the appended claims.

We claim:

1. A method for making a strong, high-surface-area extruded alumina body which comprises the steps of:

providing a powder component for an extrusion batch consisting predominantly of high-surface-area alumina and wherein anhydrous high-surface-area alumina constitutes at least about 40% by weight of the powder;

combining the powder component with water, an acid, and a plasticizer in proportions effective to form an extrudable combined batch, the acid constituting at least about 1% by weight of the combined batch;

mixing the combined batch for a time sufficient to produce a homogeneous plasticized batch;

extruding the plasticized batch to form a green alumina-containing preform;

drying the green preform; and firing the green preform to a temperature in the range of about 500–1000° C. to provide a fired high-surface-area body having a BET surface area of at least about 100 m²/g.

2. A method in accordance with claim 1 wherein the powder component consists essentially of alumina powder and includes 50–100% of anhydrous alumina powder by weight.

3. A method in accordance with claim 1 wherein the acid is selected from the group consisting of acetic acid and formic acid.

4. A method in accordance with claim 3 wherein the acid is acetic acid and batch includes about 1–5 parts of concentrated acetic acid for each 100 parts of alumina powder by weight.

5. A method in accordance with claim 1 wherein the anhydrous high-surface-area alumina is a gamma alumina powder having a BET surface area of at least about 200 m²/gm.

6. A method in accordance with claim 1 wherein the anhydrous high-surface-area alumina constitutes 50–100% by weight of the dry powder component of the batch.

7. A fired alumina honeycomb formed of a sintered alumina material having a BET surface area of at least about 150 m²/g, an MOR strength as determined in 4-point rod flexure of at least about 1500 psi, and a pore size distribution wherein at least 80% of the open pore volume resides in pores having diameters in the range of about 30–300Å.

8. A fired alumina honeycomb in accordance with claim 7 which has an open pore volume of at least about 0.5 ml/g, with less than 5% of the open pore volume residing in pores of a diameter greater than 1000 Å.

* * * * *